United States Patent
Braudes et al.

(10) Patent No.: US 9,807,143 B2
(45) Date of Patent: Oct. 31, 2017

(54) SYSTEMS AND METHODS FOR EVENT ROUTING AND CORRELATION

(71) Applicant: Avaya Inc., Santa Clara, CA (US)

(72) Inventors: Robert E. Braudes, Erie, CO (US);
Kurt Haserodt, Westminster, CO (US);
Robert J. Favero, Lakewood, CO (US)

(73) Assignee: Avaya Inc., Santa Clara, CA (US)

( * ) Notice: Subject to any disclaimer, the term of this patent is extended or adjusted under 35 U.S.C. 154(b) by 337 days.

(21) Appl. No.: 14/450,771

(22) Filed: Aug. 4, 2014

(65) Prior Publication Data

US 2016/0034322 A1   Feb. 4, 2016

(51) Int. Cl.
*G06F 15/16* (2006.01)
*H04L 29/08* (2006.01)
*H04L 29/06* (2006.01)
*G06Q 10/10* (2012.01)

(52) U.S. Cl.
CPC .......... *H04L 67/02* (2013.01); *G06Q 10/10* (2013.01); *H04L 65/1096* (2013.01); *H04L 65/403* (2013.01); *H04L 65/605* (2013.01)

(58) Field of Classification Search
CPC ... H04L 67/02; H04L 65/1096; H04L 65/403; G06Q 10/10
USPC .......... 709/204, 205, 206, 207, 217
See application file for complete search history.

(56) References Cited

U.S. PATENT DOCUMENTS

| | | | |
|---|---|---|---|
| 5,566,337 A * | 10/1996 | Szymanski | G06F 9/542 710/260 |
| 7,853,961 B2 | 12/2010 | Nori et al. | |
| 8,069,437 B2 | 11/2011 | Aigner et al. | |
| 2004/0153998 A1 * | 8/2004 | McGuire | G06F 9/542 717/128 |
| 2006/0080120 A1 * | 4/2006 | Tcherevik | G06F 9/542 719/318 |
| 2010/0185951 A1 * | 7/2010 | Nichols | H04L 65/4015 715/738 |

OTHER PUBLICATIONS

"Apache Kafka: A high-throughput distributed messaging system," Kafka 8.0 Documentation, Oct. 26, 2013, 44 pages.

* cited by examiner

*Primary Examiner* — Liangche A Wang
*Assistant Examiner* — Kaylee Huang
(74) *Attorney, Agent, or Firm* — Sheridan Ross P.C.

(57) ABSTRACT

A collaboration environment provides a generic event distributing framework that can distribute both synchronous and asynchronous events. The distributed events may be pre-defined or dynamically defined. Further, the framework can support multiple data formats for the event payload. The collaboration environment relies on two separate APIs to separate event producers from event consumers.

13 Claims, 11 Drawing Sheets

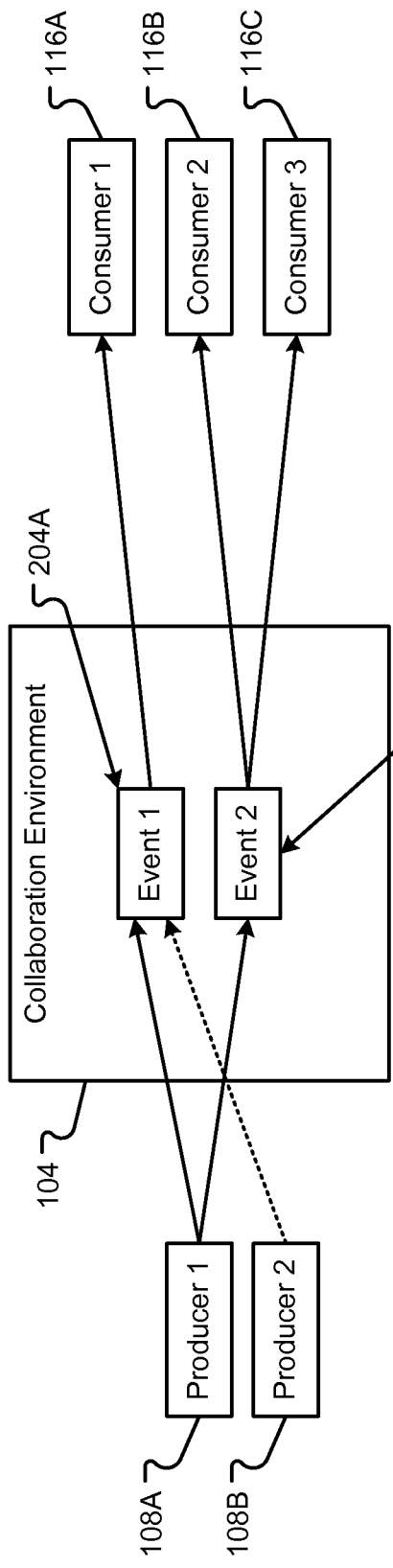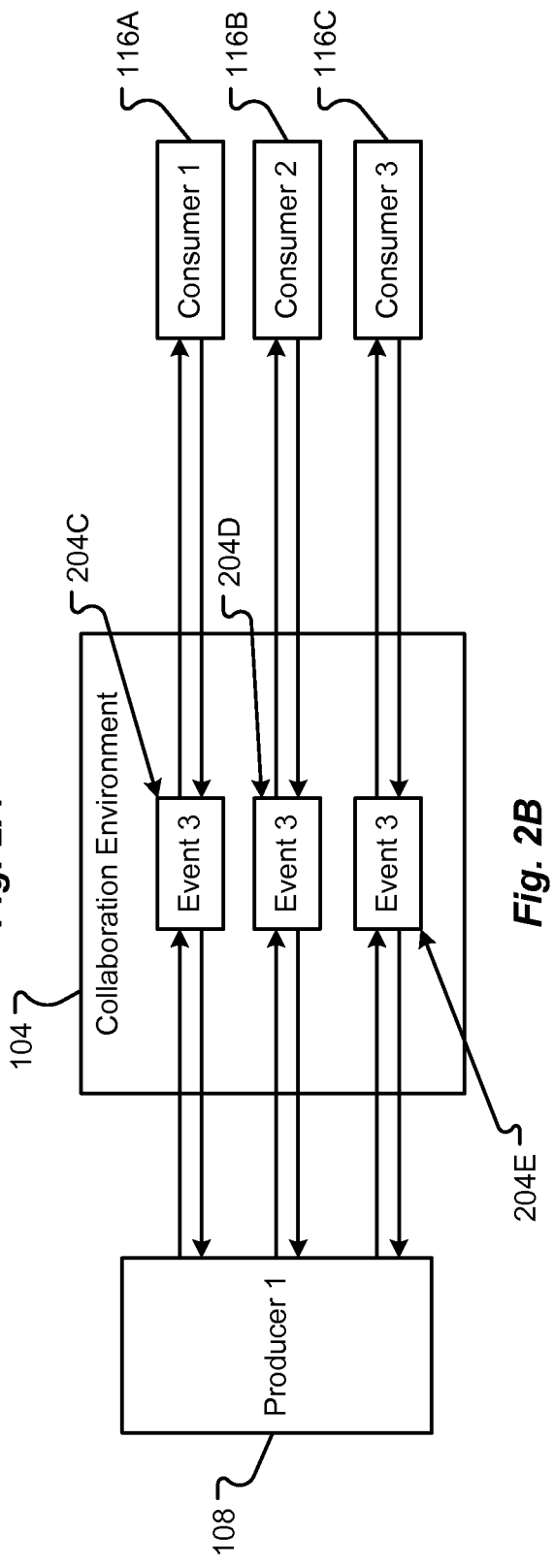

SYSTEMS AND METHODS FOR EVENT ROUTING AND CORRELATION

BACKGROUND

Collaboration environment are generally systems and processes for integrated application development or interaction. A collaboration environment can allow developers or users to employ existing applications or build new applications that can include unified communications technology and, in some situations, contact center capabilities including voice, video, text, and email.

As a platform, a collaboration environment can deliver notifications of events to the various services deployed in or users communicating with the environment. Thus, the collaboration environment allows services to publish events that other services may want to receive. These events can be pre-defined, such as SIP origination and termination events, incoming HTTP requests, incoming email or text messages, system utilization events, etc. The events can be defined by a service, such as a user completing a form on a web application. Events may be sent or received either synchronously, where the event receiver has the opportunity to manipulate the data associated with the event before other event consumers receive the event, or asynchronously, where all receivers are notified at approximately the same time. For synchronous events, a defined order of notifications is generally prescribed.

Unfortunately, current systems do not provide support for both pre-defined and dynamically defined events with varying payloads. Current collaboration environments often have applications and elements that are not able to communicate and provide subscription information and event information between the elements that receive the events. Current collaborative software and workflow systems do not provide seamless subscribing and event distribution with an easy-to-administer user interface. Additionally, the current collaboration environments are not sufficiently general-purpose for many users.

SUMMARY

It is with respect to the above issues and other problems that the embodiments presented herein were contemplated. The embodiments presented herein generally provide a collaboration environment including a generic event distributing framework that can distribute both synchronous and asynchronous events. The distributed events may be pre-defined or dynamically defined. Further, the framework can support multiple data formats for the event payload. The collaboration environment may rely on two separate APIs to separate event producers from event consumers.

The event framework provides the ability to execute event distribution, which occurs over a collaboration bus (CB) using an Application Programming Interface(s) (API). The APIs can have two or more parts. One part of the API may be associated with the event producer(s) (referred to as "API Impl-P") and another part of the API may be associated with the consumer(s) (referred to as "API Impl-C"). A JavaScript Object Notation (JSON) format may be used for communication with or among the API(s), so that both sides of the API can handle information in a common format.

The service that produces events can include, but is not limited to, a Call Eventing Call Signaling service. The event producing service can declare events that the service can produce. Thus, the event producing service can describe each event and declare the events type, family, payload description, etc. Examples of event types can include one or more of, but is not limited to, a SIP origination event, a SIP termination event, a button pressed on a web page, etc.

A consumer can determine that the consumer is interested in an event. If interested, the consumer can subscribe to the event using the API Impl-C. The subscribe action may add an entry in a database for the consumer as a listener for the specified event or event type. The entry in the database may also include a JMS queue on which the event should be sent. The API Impl-C interface can provide a method for the consumer to indicate interest. Multiple subscriptions for the same family and type may be allowed and may be maintained as separate subscriptions. The API Impl-C interface may contain the following elements:

1. Family
2. Type
3. SyncAsync
4. Listener
5. JMS queue

When a producer generates an event to be distributed, the producer calls the API. The API Impl-P can access an internal table to determine whether there are subscribed listeners for that event. If there are listeners subscribed for the event, the event framework can write the event to the queue or queues of associated with the subscribed consumers. If there are no subscribers, the event may be dropped. The event framework may have catalogs of families and events that they can produce. All events can have a unique ID. The API Imp-P interface may contain the following parameters:

1. Family
2. Type
3. User
4. Body

Subscribed consumers can be maintained in an ordered list, based on information provided to the event framework. If an event is sent synchronously, the first consumer in the ordered list is notified and, if the subscription request was designated for synchronous processing, the first consumer is given an opportunity to modify the event data. Once the first consumer has completed any event processing, the first consumer informs the event framework, which then notifies the producer to incorporate the changes made by the first consumer. The producer may then inform the event framework to notify the next consumer, and the event may then be sequentially sent to a second consumer, third consumer, etc. This cycle continues until all subscribed consumers have handled the event or the producer terminates propagation.

Embodiments include a method for providing an event in a collaboration environment, the method comprising: receiving an event from a producer at a first application programming interface (API); determining if a listener has subscribed to the event; and if the listener has subscribed to the event, sending the event to the listener with a second API.

Aspects of the above method further comprise: receiving an event description in a catalog for the event; and receiving a subscription to the event in the catalog.

Aspects of the above method include wherein a subscriber services module determines if the listener has subscribed to the event by identifying the subscription to the event in the catalog.

Aspects of the above method further comprise translating the event from a first language into a general language with the first API.

Aspects of the above method further comprise translating the event from the general language into a second language with the second API.

Aspects of the above method further comprise the second API determining if the event is synchronous.

Aspects of the above method further comprise: if the event is synchronous, the second API sending the event to a first listener; receiving a first response from the first listener, wherein the first response includes a change to the event; and sending the event with the change to a second listener.

Aspects of the above method further comprise, if a third listener indicates that the third listener wants to receive the event asynchronously, the second API sending the event to the third listener as an asynchronous event.

Aspects of the above method further comprise, if the event is asynchronous, the second API sending the event to a first listener and a second listener substantially simultaneously.

Aspects of the above method include wherein the event is communicated with one of a SIP protocol or an HTTP protocol.

Embodiments include a collaboration environment comprising: a processor, the processor operable to execute: a first application programming interface (API), the first API operable to: receive an event from a producer; translate the event from a first language into a general language; send the event to one of a second API or a collaboration bus; a subscriber services module operable to: determine if a listener has subscribed to the event by identifying a subscription to the event in a catalog; provide an indication to the second API as to whether the listener has subscribed to the event; a second API operable to: receive the event from one of the first API or the collaboration bus; receive the indication from the subscriber services module as to whether the listener has subscribed to the event; if the listener has subscribed to the event, translate the event from the general language into a second language; and send the event to the listener.

Aspects of the above collaboration environment include wherein the second API is further operable to determine if the event is synchronous.

Aspects of the above collaboration environment include wherein the second API is further operable to: if the event is synchronous, send the event to a first listener; receive a first response from the first listener, wherein the first response includes a change to the event; and send the event with the change to a second listener.

Aspects of the above collaboration environment include wherein the second API is further operable to, if a third listener indicates that the third listener wants to receive the event asynchronously, send the event to the third listener as an asynchronous event.

Aspects of the above collaboration environment include wherein the second API is further operable to, if the event is asynchronous, send the event to a first listener and a second listener substantially simultaneously.

Embodiments include a computer readable medium, device, system, means, etc. having stored thereon processor executable instructions that cause a computing system to execute a method, the instructions comprising: instructions to receive an event description in a catalog for an event; instructions to receive a subscription to the event in the catalog from a listener; instructions to receive an event from a producer; instructions to translate the event from a first language into a general language; instructions to send the event to a collaboration bus; instructions to determine if a listener has subscribed to the event by identifying the subscription to the event in the catalog; instructions to receive the event from the collaboration bus; if the listener has subscribed to the event, instructions to translate the event from the general language into a second language; and instructions to send the event to the listener.

Aspects of the above further comprise: instructions to determine if the event is synchronous; if the event is synchronous, instructions to send the event to a first listener; instructions to receive a first response from the first listener, wherein the first response includes a change to the event; instructions to send the event with the change to a second listener instructions to determine statistical information about the phoneme string, wherein the statistical information includes a confidence score that the phoneme string indicates a characteristic; and if a third listener indicates that the third listener wants to receive the event asynchronously, instructions to send the event to the third listener as an asynchronous event Aspects of the above further comprise: instructions to determine if the event is synchronous; and if the event is asynchronous, instructions to send the event to a first listener and a second listener substantially simultaneously.

Aspects of the above include wherein the event is communicated with one of a SIP protocol or an HTTP protocol.

Aspects of the above further comprise instructions to apply a filter for the listener to determine if the listener needs to receive the event.

The term "collaboration environment," as used herein, can refer to an organization or elements used for collaboration and interaction of possibly many participants. The applications of a collaboration environment are usually based on a shared virtual environment. The environments can combine best features of web-based conferencing and collaboration, desktop videoconferencing, instant messaging, etc. into a single easy-to-use, intuitive environment.

The term "producer," as used herein, can refer to any service or user that generates, communicates, or supplies events into the collaboration environment.

The term "consumer" or "listener," as used herein, may be used interchangeably and can refer to any service or user that listens to or receives events in the collaboration environment.

The term "collaboration bus," as used herein, can refer to an interface to send and receive events between services or users. The collaboration bus can include one or more channels that can route events between services or users. The collaboration bus may exchange events using a point-to-point (Queue) model or a publish/subscribe (Topic) model.

The term "Application Programming Interface (API)," as used herein, can refer to a specification of how software components should interact with each other. Generally, an API can include a library that includes specifications for routines, data structures, object classes, and variables. The library can provide a specification of how to accomplish a specific task or how to interact with a specific software component. The API may also include a specification of calls exposed to the API consumers.

The term "event," as used herein, can refer to an action or occurrence detected and/or sent by a producer that may be handled by a consumer/listener.

The term "subscribers," as used herein, can refer to a consumer that desires to and creates a subscription to receive an event.

The term "subscribers," as used herein, can refer to a consumer request for an event. The subscriber can register the interest, in an event, with the subscription and filter events based on information in the registered subscription.

The term "catalog," as used herein, can refer to a data structure that lists events that may be received from the collaboration environment. The catalog can include data or information associated with each event.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

BRIEF DESCRIPTION OF THE DRAWINGS

The present disclosure is described in conjunction with the appended figures:

FIG. 2A is a block diagram of an embodiment of a collaboration environment sending asynchronous events;

FIG. 2B is a block diagram of an embodiment of a collaboration environment sending a synchronous event;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1:
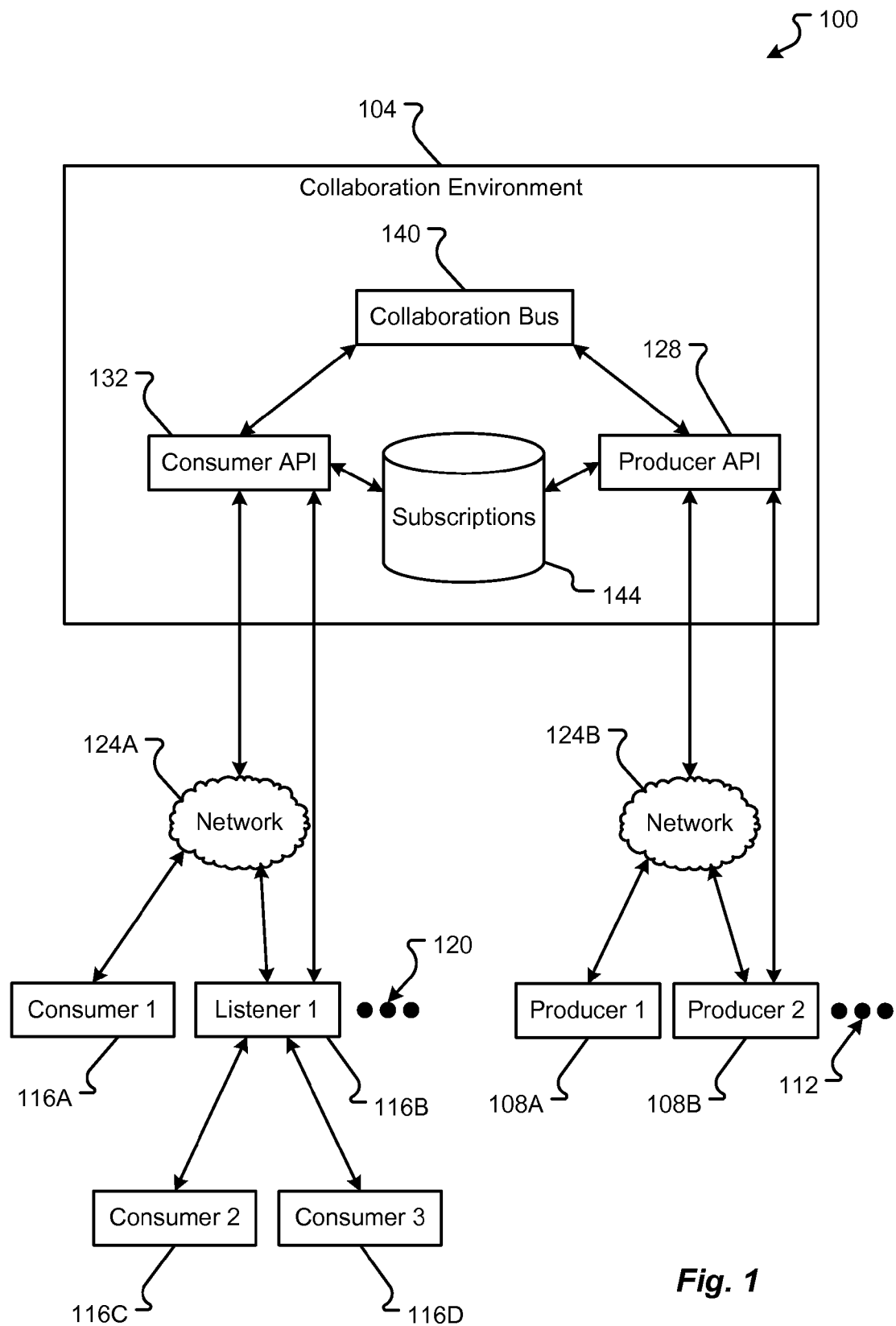
FIG. 1 is a block diagram of an embodiment of a collaboration environment operable to distribute events.

An embodiment of a collaboration system 104 is shown in FIG. 1. Here, the collaboration environment 104 may be in communication with producers 108 and consumers/listeners 116. Producers 108A, 108B, etc., can produce events or other information that is communicated through a network 124B to the collaboration environment 104. A consumer/listener 116 can receive the events or other information from the producers 108 through network 124A. Alternatively or additionally, the producers 108 and consumers/listeners 116 may send and/or receive events directly through, from, or to the collaboration environment 104, without using a network 124. There may be one or more consumers/listeners 116A, 116B, etc. There may be more producers 108 than those shown in FIG. 1, as represented by ellipses 112. Similarly, there may be more consumers/listeners 116 than those shown in FIG. 1, as represented by ellipses 120. There can be multiple producers 108 for the same event and there may be multiple consumers/listeners 116 to the same event. A single listener 116B may distribute one or more events to two or more consumers/listeners 116C, 116D. Thus, a listener 116B can "multicast" events.

Figure 3:
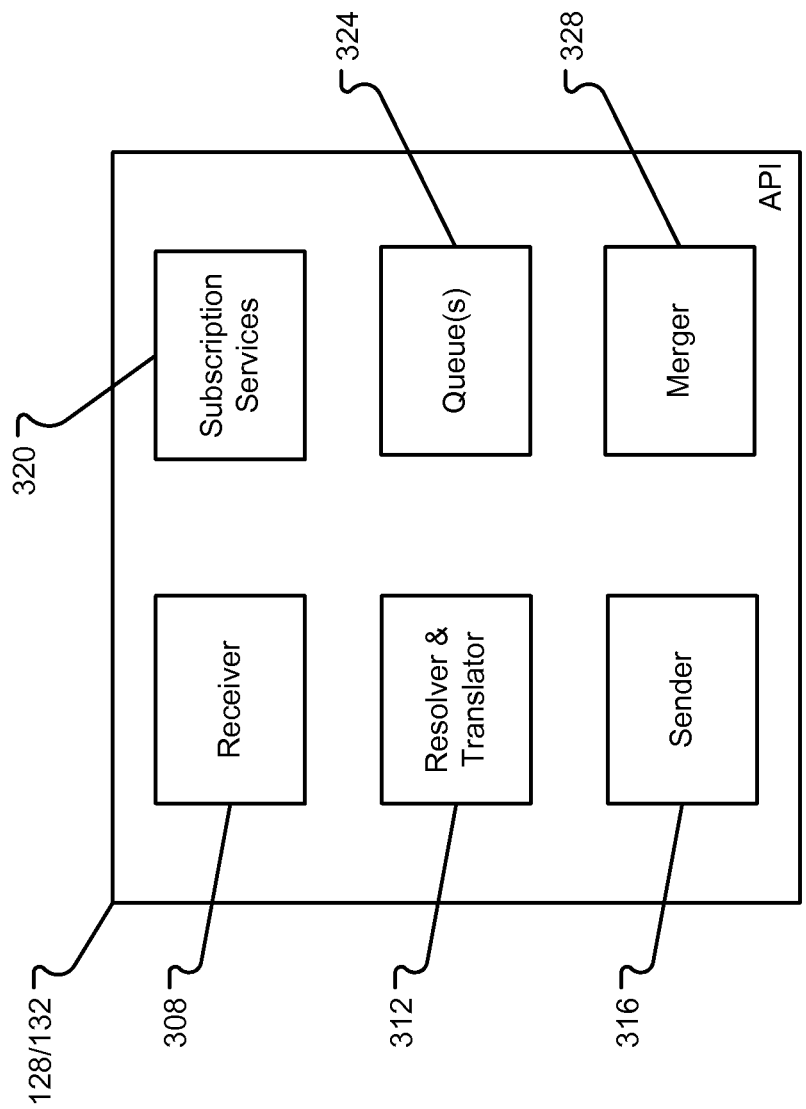
FIG. 3 is a block diagram of an embodiment of an consumer or producer API.

The collaboration environment 104 can include one or more application programming interface(s) (API) 128, 132. The APIs 128,132 can allow for the different types of collaboration described herein. A producer API 128 (also referred to as an API Impl-P) can send messages to and receive messages from the producers 108. The consumer API 132 (also referred to as an API Impl-C) can communicate with consumers/listeners 116 to send or receive events from the consumers/listeners 116 and can write to one or more databases. The producer API 128 and consumer API 132 may communicate with and through a collaboration bus 140. The APIs 128, 132 may be any hardware, software, or a combination of hardware and software operable to perform the functions described herein. An example of one or more of the APIs 128, 132 may be as shown in FIG. 3. Having at least the producer API 128 and the consumer API 132 decouples the event producers 108 from the event listeners or consumers 116.

The collaboration bus 140 is operable to send messages between producers 108 and consumers/listeners 116. The collaboration bus 140 may be any hardware, software, or a combination of hardware and software operable to perform the functions described herein. Generally, the collaboration bus 140 can distribute events and may retrieve information needed to distribute the events.

Figure 4A:
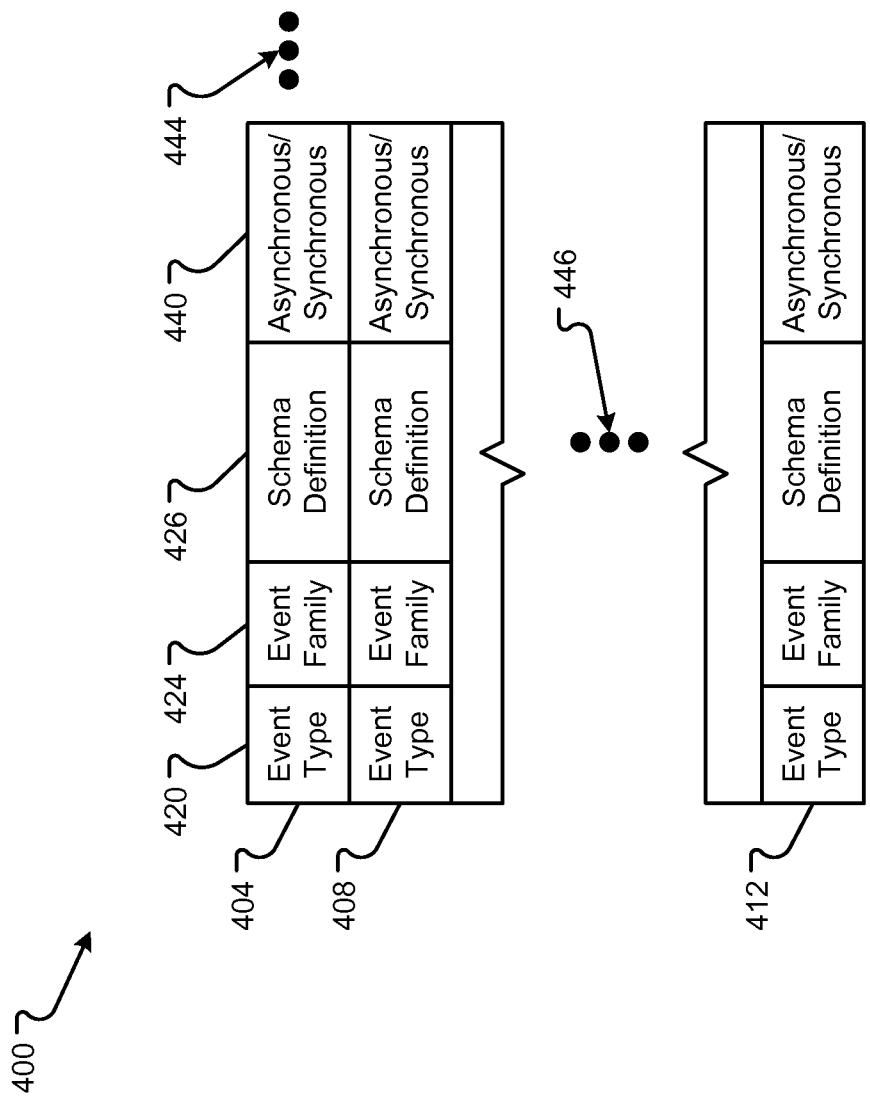
FIG. 4A is a block diagram of an embodiment a data structure or database for that may define event subscriptions.
Figure 4B:
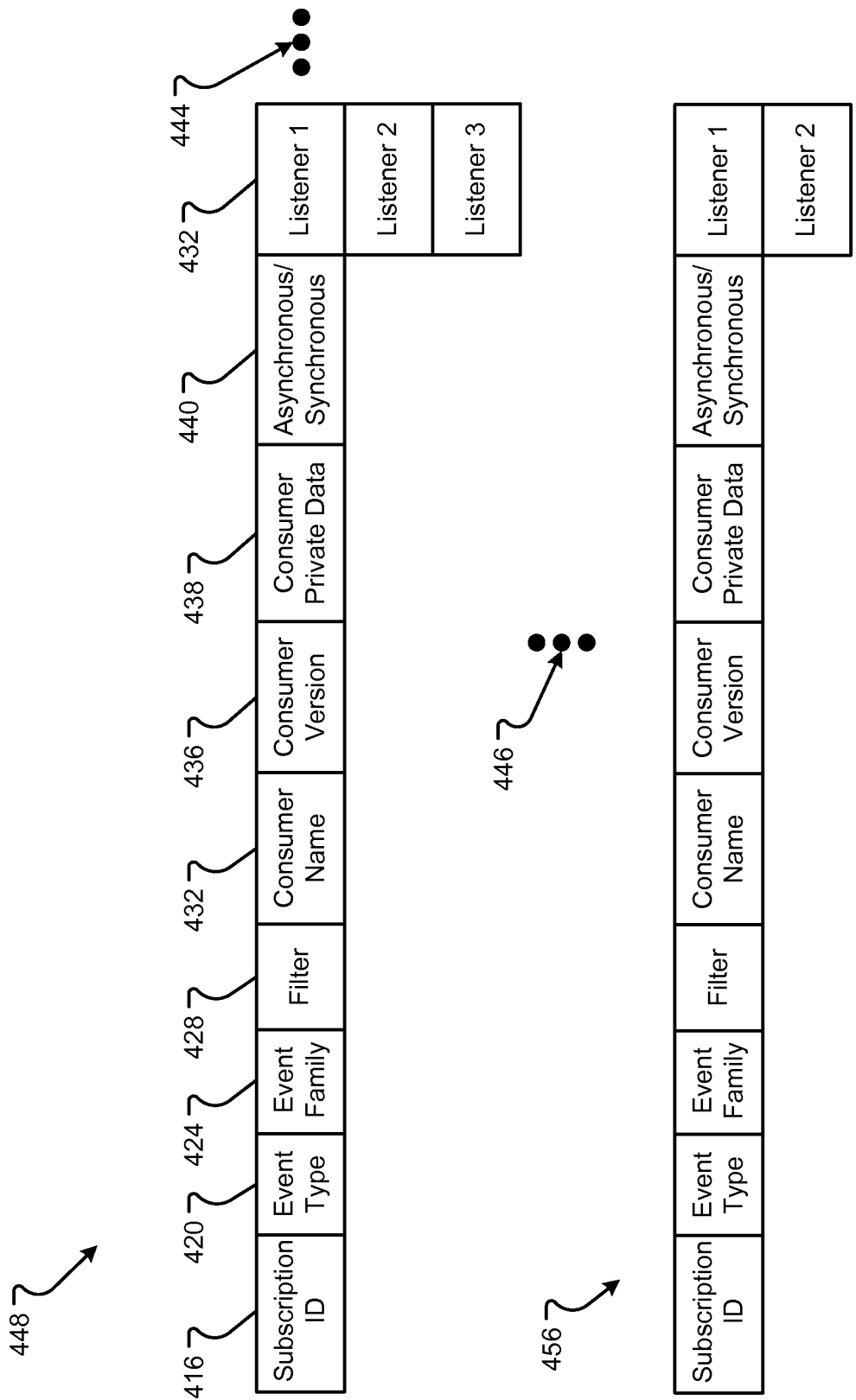
FIG. 4B is a block diagram of an embodiment a data structure or database for subscribing to events.

The APIs 128, 132 may be in communication with or may make entries in one or more databases that may include, but are not limited to a subscriptions database 144. These databases may be any type of data structure or database, for example, flat-file databases, relational databases, object oriented databases, etc. An example of the one or more databases and/or the information stored therein, received at, or sent from the collaboration environment 104 may be as shown in FIGS. 4A and 4B.

An embodiment of a data flow to communicate asynchronous events may be as shown in FIG. 2A. Here, a first producer 108A may send a first event 204A through the collaboration environment 104 to a first consumer/listener 116A. A second producer 108B may also send a first event 204A to a first consumer/listener 116A. Thus, more than one producer 108 can send the same or similar event to one or more consumer/listener 116. In another situation, the first producer 108 may send a second event 204B simultaneously to two consumers/listeners 116B and 116C. Thus, the collaboration environment 104 is operable to broadcast or send events 204 asynchronously to two or more different consumers. The collaboration environment 104 may also be able to send events synchronously as shown in FIG. 2b. Alternatively or additionally, the listener 116 can send information, in a response, back to the collaboration environment 104 rather than send back the event 204. The collaboration environment 104 or the producer 108 may then modify the event 204 to send to the next listener 116.

With a synchronous event, a producer 108 may provide for a third event 204C that is sent to a first consumer/listener 116A. The first consumer/listener 116A may conduct some operation or other process on the event and return that event 204C, or a response to the event 204C, back to the collaboration environment 104 or inform the collaboration environment 104 of the changes with the response. The collaboration environment 104 can inform the producer 108 of the changes. The producer 108 can act upon the changes and then may send the updated event 204D to a second consumer/listener 116B, which may also provide or conduct other operation(s) on the event 204D and return the event 204D or a response to the collaboration environment 104. The producer 108 may then act upon those additional changes and send the event 204E to a last consumer/listener 116C, which may also return the event 204E if necessary. Thus, the collaboration environment 104 is operable to both send asynchronous and synchronous events.

An embodiment of an API, which may represent any of APIs 128, 132, is shown in FIG. 3. The API 128,132 can include one or more components, which may be hardware, software, or a combination of hardware and software. The API 128, 132 can be executed by a computer system, such as those described in conjunction with FIGS. 7 and 8. Alternatively or additionally, the components described in conjunction with FIG. 3 can be logic circuits or other specially-designed hardware that are embodied in a FPGA, ASIC, or other specially-designed hardware. The API 128, 132 may include one or more different modules that can conduct operations as described herein. These different modules may include a receiver module 308, a resolver and translator module 312, a sender module 316, a subscription services module 320, one or more queues 324, and a merger module 328.

The receiver module 308 may be operable to receive events 204 from a producer 108 or a consumer/listener 116. The event 204 received from a producer 108 may be a synchronous or asynchronous event 204. Synchronous events 204 can be returned from the consumer/listener 116 back to the collaboration environment 104 and producer 108, as described in conjunction with FIG. 2B. The receiver module 308 may send received events 204 to the collaboration bus 140.

A resolver and translator 312, when an event 204 is received, can access subscription information 144 to determine if the event 204 has one or more subscribers. If the event does have subscribers, the resolver and translator 312 can resolve the consumers/listeners 116 that should receive the event 204. The resolver and translator 312 can then inform the collaboration bus 140 to send the event to the consumer API 132 and then to the one or more consumers/listeners 116.

The resolver and translator 312 may also translate the language or notation of the event from a first language/protocol to a second language/protocol. In some situations, the APIs 128, 132 may conduct communications with the collaboration bus 140 using a JavaScript object notation (JSON) format. As such, any message received from a consumer/listener 116 or producer 108 that is not in the JSON format may be translated into JSON. With the common JSON language, definitions for the events may be standardized for the collaboration environment 104. The API resolver and translator 312 may then be able to modify the standard JSON format of the event 204 in the collaboration environment 104 into a producer 108 or consumer/listener 116 specific language or format. The resolver and translator 312 may also translate events into other standard languages/protocols different from JSON.

A sender 316 can send an event 204 or response to a producer 108 or a consumer/listener 116. The sender 316 may transmit the event message 204 using any type of protocol or system. The sender 316 may send asynchronous or synchronous event messages 204 to the consumer/listener 116. However, the sender 316 may only send returned synchronous event messages 204 to a producer 108.

Subscription services 320 is a module that is operable to interface with the subscriptions database 144. Subscription services 320 may allow a consumer/listener 116 to determine if there are events 204 to which the consumer/listener 116 wishes to subscribe. If there are events 204 to which the consumer/listener 116 does wish to subscribe, the consumer/ listener 116 may provide information, through the subscription services 320, to the subscriptions database 144 to ensure that any event 204, with a particular event identifier, in an event family, or of a certain type of event is sent to the consumer/listener 116. Further, the producers 108 may access subscription services 320 to provide information to a catalog for consumers/listeners 116 to subscribe to an event.

One or more queues 324 may be provided for one or more different consumers/listeners 116 or producers 108. When an event 204 is received, the receiver can determine the characteristics of the event 204, and then place the event 204 into one or more queues. The queues may be associated with a listener 116, an event family, an event type, or the event. Thus, the queues 324 temporarily store the events 204 before the events 204 are sent to the consumers/listeners 116.

A merger module 328 can merge events 204. Two or more events 204 may be produced from an action or other occurrence. For example, two producers 108 may generate the same event 204 from a same or similar occurrence. Both events 204 may be received by the API 128/132. The merger 328 may evaluate or compare the two or more events 204 as received and/or stored in the queue 324. If the events 204 have the same characteristics, the merger 328 can merge or combine the events 204 into a single event 204. Merging events 204 can include deleting all but one of similar events and/or consolidating information from two or more events 204 into a single event 204.

Figure 4C:
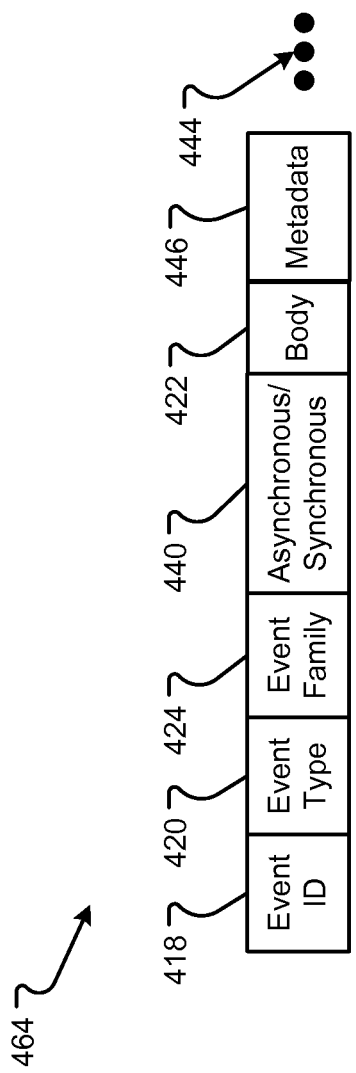
FIG. 4C is a block diagram of an embodiment a data structure or database for an event that may be send by a producer.
Figure 4D:
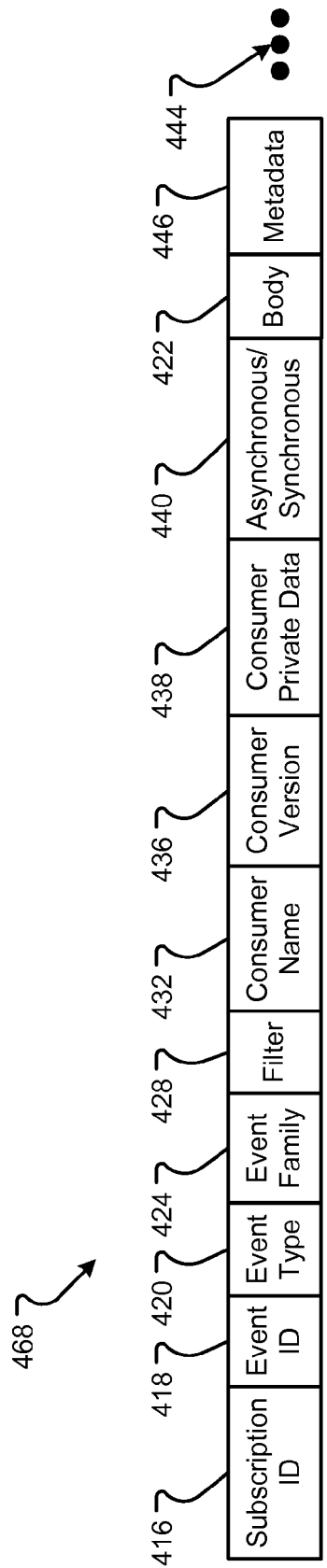
FIG. 4D is a block diagram of an embodiment a data structure or database for an event that may be received by a listener.

Embodiments of data structures that may be stored, sent, or received in the collaboration environment 104 are shown in FIGS. 4A through 4D. A subscription definition 400 associated with a catalog may be as shown in FIG. 4A. A subscription data structure 448 may be as shown in FIG. 4B. An event data structure 464, as sent by a producer 108, may be as shown in FIG. 4C. Finally, an event data structure 468, as received by a listener 116, may be as shown in FIG. 4D. Each record or event 404, 408, 412, 448, 456, 464, or 468 may have one or more fields 416 through 440. There may be more or fewer records than those shown in FIGS. 4A through 4D, as represented by ellipses 446. There may be more or fewer fields than those shown in FIGS. 4A through 4D, as represented by ellipses 444. Each record can have one or more of, but is not limited to, a subscription identifier (ID) 416, an event identifier 418, an event type 420, an event family 424, a filter 428, a consumer name 432, a consumer version 436, a consumer private data, a body 422, metadata 446, a scheme definition 426, and an indication of asynchronous/synchronous 440. The ability to define a subscription to an event 204 allows for the customization of delivery of events 204. Further, the event subscriptions may be dynamically created. The databases 400, 448, 464, 468 are therefore extensible. It should be noted that the event data structure 468, received by a listener 116, is formed by applying information in the subscription definition 400 and/or the subscription data structure 448 (e.g., the filter information) to the data structure 464 for the event 204 produced by the producer 108.

The event type 420 can be a type of event. There may be produced one or more events that are of the same event type 420. For example, event 404 and event 408 might have the same event type 420. The event type may be used by a consumer/listener 116 to determine if the consumer/listener 116 wants to subscribe to one or more events associated with that type of event 420.

An event family 424 can specify or define interrelations between different event types. Thus, the user or subscriber can subscribe to one or more event families 424 and receive all events in of that event type 420 associated with the family 424. The event families 424 and event types 420 form a hierarchical structure of different types of events or an organization of events. The event family 424 is of a higher order than the event type 420. Thus, two or more event types 420 can be of the same event family 424.

The schema definition 426 can include any information about what is to be included in the event message 204. For example, the schema definition 426 may include what fields or information is provided in the body 422 and/or metadata 446 of the event message 204. Further, the schema definition 426 may include information about the protocol, language, and/or syntax used in the event message 204. As such, the schema definition 426 can provide the information required by the resolver and translator 312 to translate the message 204.

An indication of whether the event is asynchronous or synchronous is provided in field 440. In one situation, the indication 440 may be a single bit that, when set, signifies that the event is synchronous. If the bit is not set, then the event can be presumed to be asynchronous. Other types of indications may be possible and are included herein. Regardless, the indication 440 provides for information as to whether or not the APIs 128 and 132 should send the information as a synchronous or asynchronous event. The asynchronous or synchronous indication 440 can also indicate, in the subscription data structure 448, how a listener 116 desires to receive the event. Thus, a listener 116 can indicate to receive synchronous events either synchronously or asynchronously. The listener 116 cannot receive asynchronous events synchronously, and this indication is not possible in data structure 448. If no indication is given, the producer 108 can send the event as designated in indication 440 in data structure 400.

The subscription identifier 416 can include any identifier that uniquely identifies that subscription amongst all the other subscription provided in the subscription database 144. The subscription identifier 416, therefore, can be a globally unique identifier, an alpha numeric identifier, numeric identifier, a symbolic identifier, or some other type of identifier.

A filter 428 can include a description of information that may be used to determine if an event 204 should be sent to the listener 116. Thus, the filter 428 can include one or more rules to filter events. The filter 428 can apply to the event information or to the message information in the body 422 and/or metadata 446. For example, any information or metadata 446 associated with an event 204 can be used to filter events 204. The metadata 446 or information used in the filter can include one or more of, but is not limited to, the event family 424, the event type 420, the producer 108, etc. The listener 116 can include the filter information in the filter field 428 when subscribing. Filter information 428 allows a listener 116 to further delineate which of the multiple events the subscriber wants to receive based on the event characteristics.

A consumer name 432 can include any information about the consumer or listener 116 of the event 108 or about one or more consumers/listeners 116 that may be interested in the event. This consumer information 432 may be used to determine that if one consumer/listener 116 is interested in the event.

The consumer version 436 includes information that characterizes the listener 116, for example, a software version number The consumer private data 438 can include information associated with the listener 116 that is requested by the listener 116 to be included with the event 116. A listener 116 can require information such as passwords, routing information, etc. This information may be included in the consumer private data 438.

The listener information 432 may be the same as that provided in field 432 of database structure 400. Each record 452, 456 provides for which consumers/listeners 116 are listening to the event(s) having the ID 416. Each listener 116 may be a different user. As shown, event record 448 has three listeners 116 in column 432. Event record 456 has two listeners 116. This information allows for the APIs 128, 132 to determine which consumers/listeners 116 should receive the event information.

The event identifier 418 can include any identifier that uniquely identifies that event amongst all or at least some of the other events provided. The event identifier 418, therefore, can be a globally unique identifier, an alpha numeric identifier, numeric identifier, a symbolic identifier, or some other type of identifier.

The metadata field 446 can include information about the event 204 that is not included in the other fields. The metadata 446 may describe the event by what is in the body 422 of the event 204. The metadata 446 may be used by the filter 428 for determining if a listener 432 should receive the event 204.

The body 422 can include the event information as defined by the event schema 426.

Figure 5:
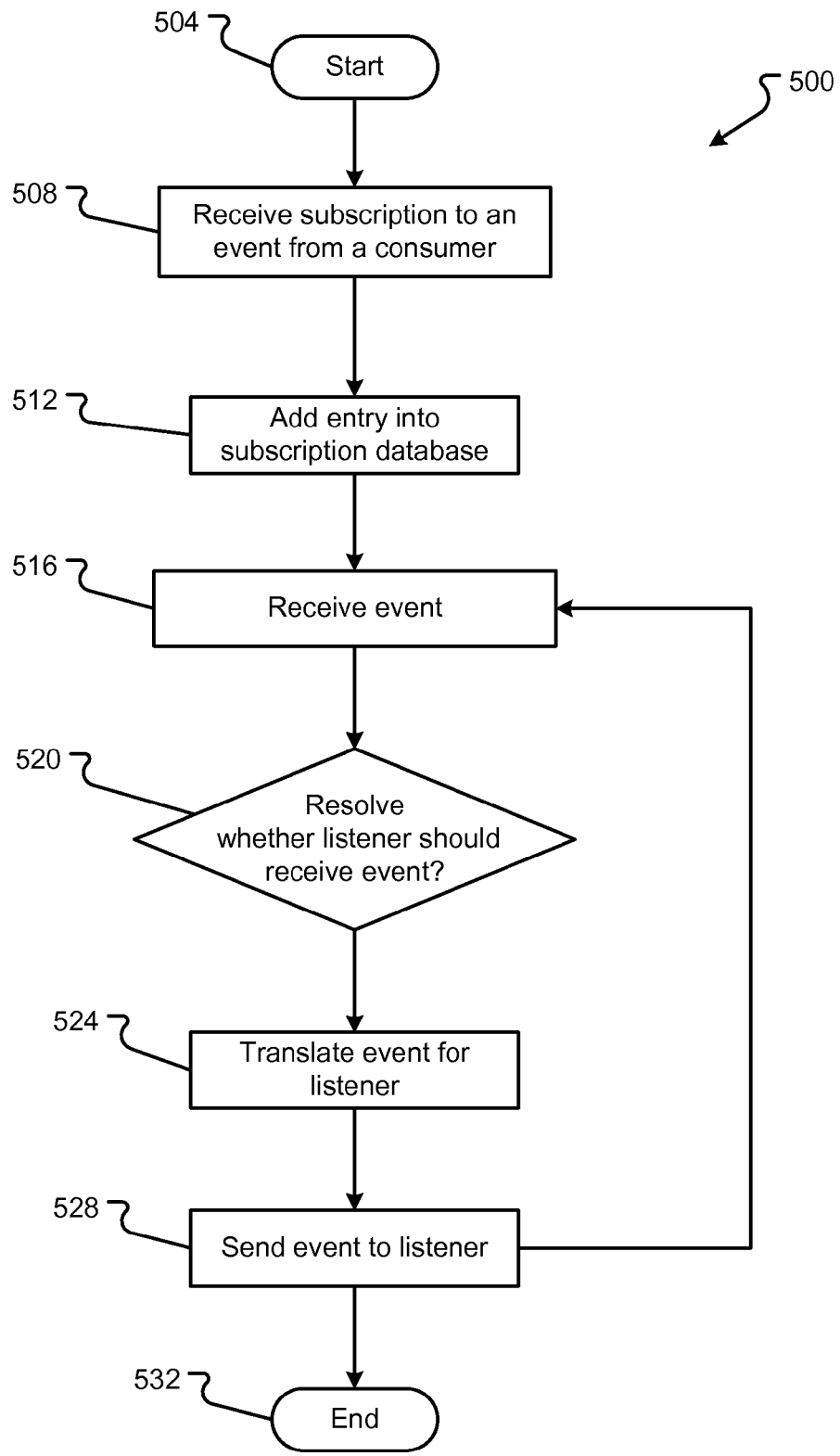
FIG. 5 is a flow diagram of an embodiment a process for creating a subscription for an event.

An embodiment of a method 500 for creating an entry in a subscription database for an event and receiving that event 204 is shown in FIG. 5. Generally, the method 500 begins with a start operation 504 and terminates with an end operation 532. While a general order for the steps of the method 500 are shown in FIG. 5, the method 500 can include more or fewer steps or arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, user interfaces, etc. described herein.

A consumer/listener 116 can send a request through the network 124 to the consumer API 132 to subscribe to or to review an event 204. The consumer/listener 116 may access information about or have knowledge about an event 204. Upon determining an event 204 to which the consumer/listener 116 wishes to subscribe, the subscription services 320 can receive, from the consumer/listener 116, the subscription to the event, in step 508, to become a listener 116. The subscription information, including any information about the listener 116, may be stored in the database 144 for subscription, which can include the information as described in conjunction with FIG. 4A. Thus, the subscription services 320 can add an entry into the subscription database 144, in step 512.

At some time thereinafter, a producer 108 may send an event 124 to the producer API 128. The producer API 128 can receive the event, in step 516. The event may be sent through the collaboration bus 140. The receiver 308 of the API 120 can provide any information about or garner any information from the producer 108. This information may be to the subscription services 320 and resolver and translator 312 to determine if there are any listeners 116 listed in the subscription database 144 and resolve to which listeners 116 should receive the event 204.

The producer API 120 may also use a resolver and translator 312 to translate the event if needed. The subscription services 320 can access the subscribers database 140 to determine whether a listener 116 has subscribed to receive the event, in step 520. A listener 116 subscribes to an event as described above. Further, the subscriber 116 can provide one or more rules to filter events in the listener field 432. The filter can apply to the event information, as explained in conjunction with FIG. 4A. The filter can indicate which types of events to which the consumer 166 has subscribed and that are produced by the producer 108, are to be received by the listener 116. Thus, only a subset or portion of the events related to one event subscription may be received based on the rules provided by the listener 116 in the filter. The resolver and translator 312 then resolves if any and which listeners 116 are to receive the event 204.

If no listener 116 has subscribed, the method proceeds "NO" to step 526 where the event 204 is dropped. However, if a subscriber has subscribed to receive the event 204, the method proceeds "YES" to step 524 where the resolver and translator 312 can translate the event for their listener, in step 524. The producer 128 may translate the event into a standard format as described before. This standard format may be provided to the consumer API 132. The consumer API resolver and translator 312 can then translate the event for the specific listener 116. The translated event 204 may be sent to the sender module 316 to be sent through the network 124 to the listener 116, in step 528.

Figure 6:
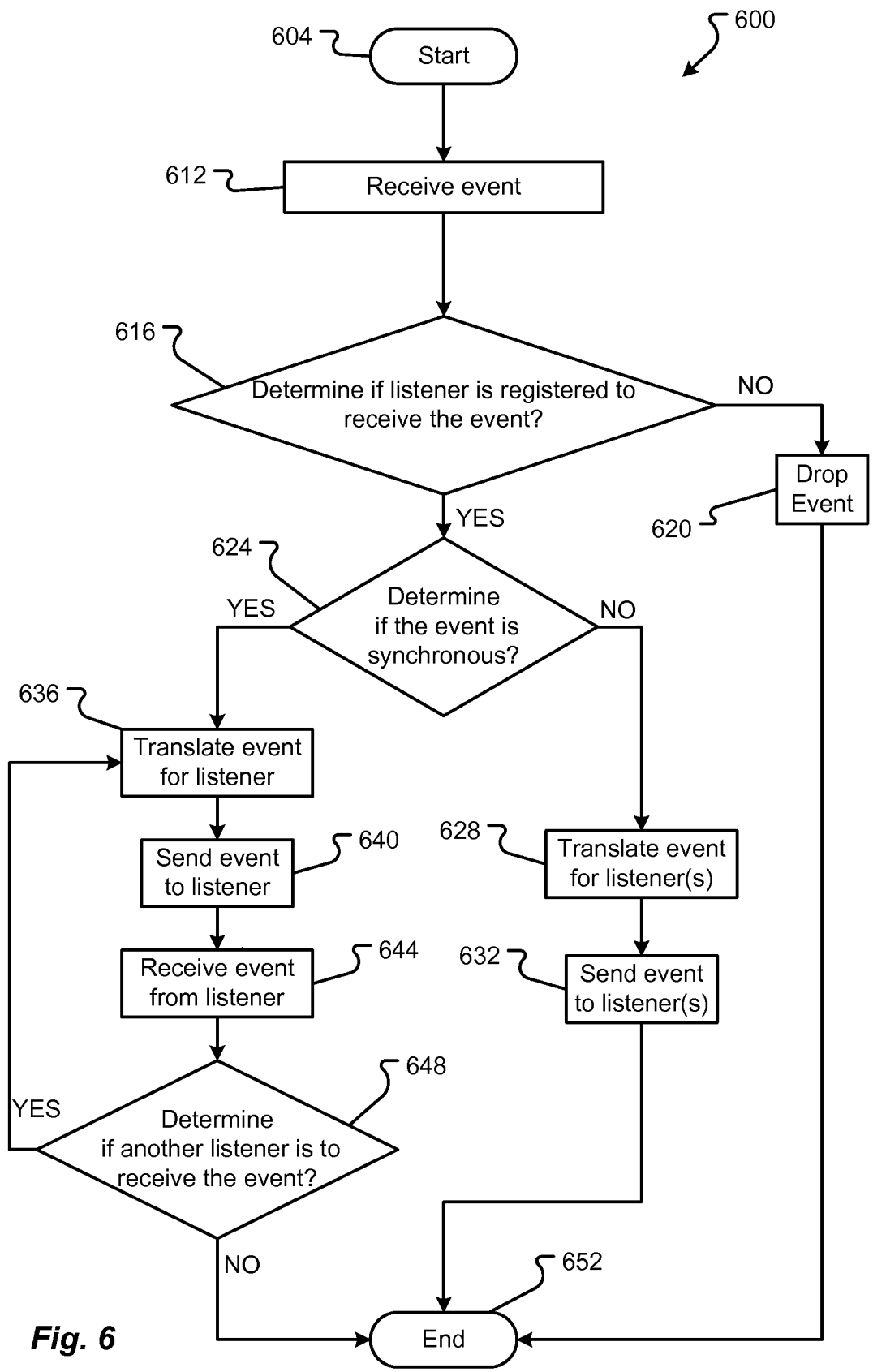
FIG. 6 is a flow diagram of an embodiment a process for distributing an event in a collaboration environment.

An embodiment of a method 600 for distributing an event in the collaboration environment is shown in FIG. 6. Generally, the method 600 begins with a start operation 604 and terminates with an end operation 652. While a general order for the steps of the method 600 are shown in FIG. 6, the method 600 can include more or fewer steps or arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

A producer 108 can produce an event. The producer API 128 can receive the event registration. A consumer 116 can register to receive the event 204, as described in conjunction with FIG. 5. At sometime thereinafter, the producer API 128 can receive an event associated with the registration from a producer 108, in steps 612. The event 204 may be translated, by a resolver and translator 312, and provided to an API 136 and/or the collaboration bus 140.

The resolver and translator 312 may determine if there is a registration by a listener 116 in the subscriptions database 144 for the event, in step 616. The determination of whether there is a listener may be as described in conjunction with FIG. 5. If there is no listener registered to receive the event 204, the method 600 may proceed "NO" to step 620 where the event is dropped by the collaboration bus 140. If there is a subscriber for the event 204, the method 600 may proceed "YES" to step 624 to determine if the event is a synchronous or asynchronous event.

The sender 316 in the producer API 128 may access information in the database 144, as described in conjunction with FIG. 4A, to determine whether the asynchronous/synchronous bit 440 is set. Further, the sender 316 may determine if the listener 116 desires the event 204 as a synchronous or asynchronous event. If the synchronous bit is set or it is determined that the event 204 is synchronous, the method 600 proceeds "YES" to step 636. However, if it is determined that the event 204 is asynchronous, the method 600 proceeds "NO" to step 628.

In step 628, the event 204 is sent to the consumer API 132. The resolver and translator 312 of the consumer API 132 translates the event 204 from the standard language used with the collaboration environment 104 to the listener-specific format or protocol. The translation of the event 204 for the listener, in step 628, provides a specifically-formatted event for the sender 316 to send to the listener 116, in step 632. Thus, the consumer API 132 sends the event through the network 124 to one or more consumers/listeners 116 simultaneously as described in conjunction with FIGS. 2A and 2B.

In step 636, the received event at the consumer API 132 is translated by a resolver and translator 312, in step 636. The translated event is described hereinbefore and may be specifically-formatted for one or more listeners 116. After the event 204 is translated, the event 204 is sent to the sender 316, which determines a first listener 116 to send the event 204 to based on the ordered list 432 provided in the subscription database 144. The first listener 116A may receive the event 204 sent by the sender 316, in step 640. The event 204 may be received by the first listener 116A, in step 644, and read and processed as required by the listener 116A. Alternatively, the listener 116A can send a response back to the collaboration environment 104, which may be incorporated by the consumer or producer API 132, 128 into the event 204 to send to a next subscriber. The consumer/listener 116A can determine if another listener is to receive the event, in step 648, or may simply send the event 204 back to the consumer API 132 after processing.

The consumer API 132 may then determine if another listener is to receive the event 204, in step 648. Here, the consumer API 132 may access the information described in conjunction with FIG. 4B to determine if another listener 116B, which succeeds the listener 116A, follows the first listener 116a in list 432. If there is another listener 116 for the event 204, the method proceeds "YES" back to step 636 where the event 204 may be translated for this next consumer/listener 116B. If there is no other listener, the method proceeds "NO" to the end step 652.

Figure 7:
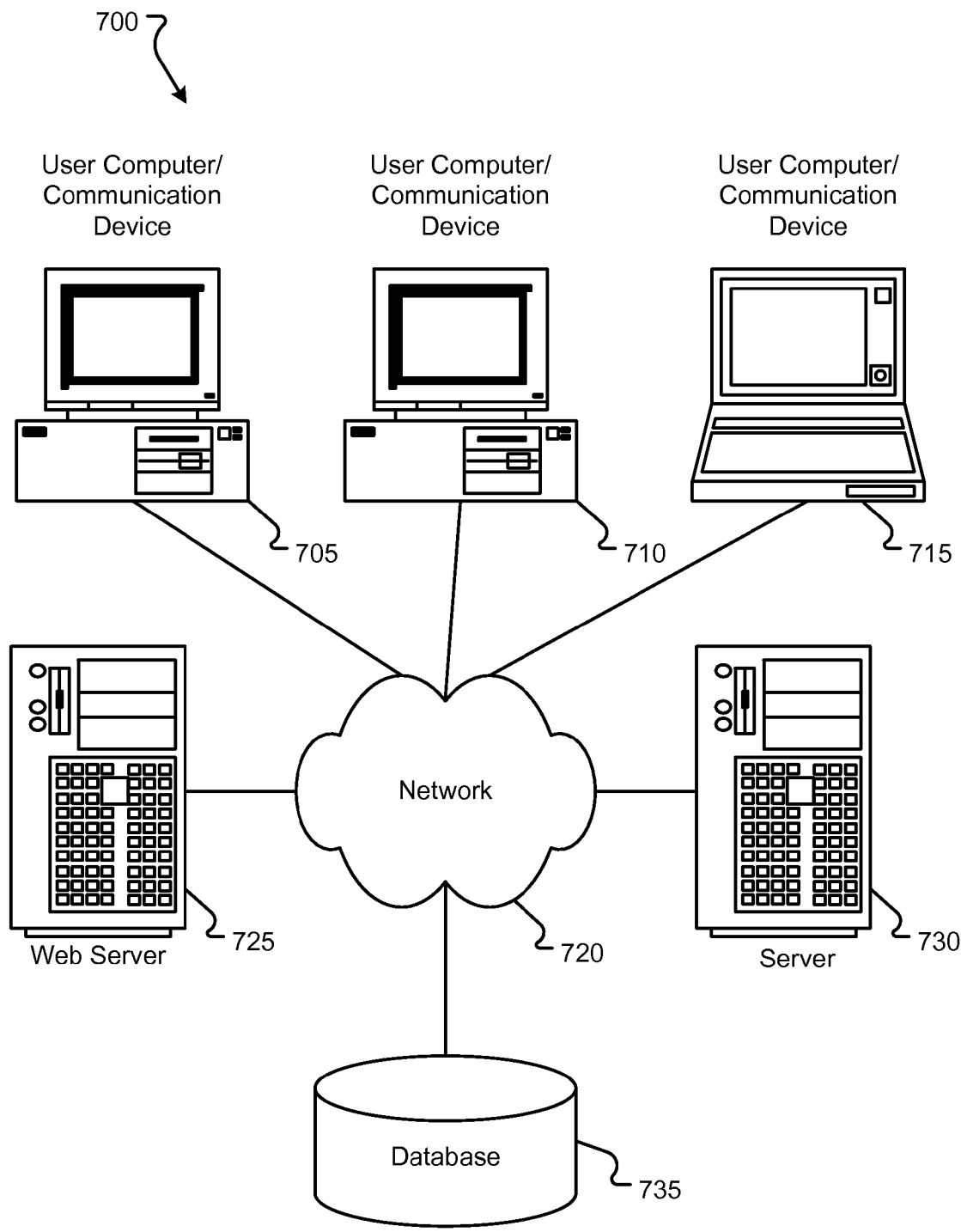
FIG. 7 is a block diagram of an embodiment of a computing environment.

FIG. 7 illustrates a block diagram of a computing environment 700 that may function as servers, computers, or other systems provided herein. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 6 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-4.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

Figure 8:
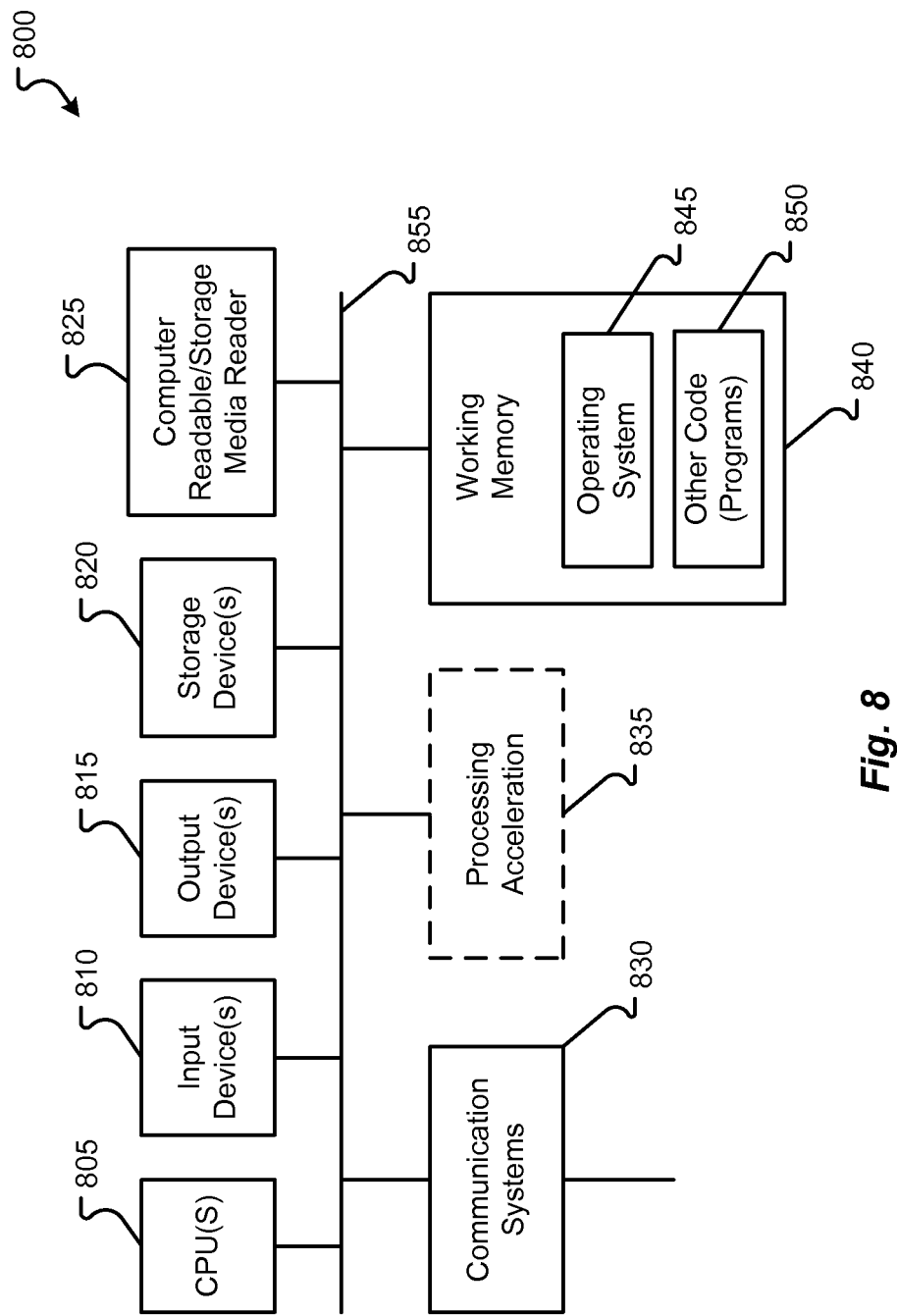
FIG. 8 is a block diagram of an embodiment of a computer system.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 (FIG. 8) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the Fig. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for providing an event in a collaboration environment, the method comprising:

a first application programming interface (API), executed by a processor:
receiving a communication from a first device associated with the event from a producer;
translating the event from a first language into a general language;
sending the event to a collaboration bus;
the processor:
determining if a first listener has subscribed to the event by identifying a subscription to the event;
providing an indication to a second API as to whether the first listener has subscribed to the event;
retrieving a list of synchronous listeners, wherein the list includes at least the first listener and a second listener, wherein each listener in the list receives the event in an order provided by the list;
if the first listener has subscribed to the event and if the event is synchronous:
the second API, executed by the processor:
receiving the event from the collaboration bus;
receiving the indication from the processor as to whether the first listener has subscribed to the event;
if the first listener has subscribed to the event, translating the event from the general language into a second language;
sending the event to a second device associated with the first listener;
receiving a first response from the first listener, wherein the first response includes a change to the event;
incorporating the change into the event; and
the processor:
sending the event with the incorporated change to the second listener;
determining if the event is synchronous; and
if a third listener indicates that the third listener wants to receive the event asynchronously, sending the event to the third listener as an asynchronous event.

2. The method as defined in claim 1, further comprising:
receiving an event description for the event; and
receiving the subscription to the event.

3. The method as defined in claim 2, wherein a subscriber services module determines if the first listener has subscribed to the event by identifying the subscription to the event in a database.

4. The method as defined in claim 3, wherein the processor sends the event with the change to the second listener through a third API.

5. The method as defined in claim 3, further comprising, if the event is asynchronous, the second API sending the event to a first listener and a second listener substantially simultaneously.

6. The method as defined in claim 5, wherein the event is communicated with one of a SIP protocol or an HTTP protocol.

7. A collaboration environment comprising:
a memory;
a processor in communication with the memory, the processor operable to execute:
a first application programming interface (API), the first API operable to:
receive an event from a producer;
translate the event from a first language into a general language;
send the event to a collaboration bus;
a subscriber services module operable to:
determine if a first listener has subscribed to the event by identifying a subscription to the event;
provide an indication to the second API as to whether the first listener has subscribed to the event;
a second API operable to:
retrieve a list of synchronous listeners, wherein the list includes at least the first listener and a second listener, wherein each listener in the list receives the event in an order provided by the list;
receive the event from the collaboration bus;
receive the indication from the subscriber services module as to whether the first listener has subscribed to the event;
if the first listener has subscribed to the event, translate the event from the general language into a second language;
send the event to the first listener;
receive a first response from the first listener, wherein the first response includes a change to the event;
incorporate the change into the event;
send the event with the incorporated change to the second listener;
determine if the event is synchronous; and
if a third listener indicates that the third listener wants to receive the event asynchronously, send the event to the third listener as an asynchronous event.

8. The collaboration environment as defined in claim 7, wherein the subscriber services module operable to determine if the second listener has subscribed to the event.

9. The collaboration environment as defined in claim 7, wherein the second API is further operable to: if the event is asynchronous, send the event to a first listener and a second listener substantially simultaneously.

10. A non-transitory computer readable medium having stored thereon processor executable instructions that cause a computing system to execute a method, the instructions comprising:
instructions to execute a first application programming interface (API), the first API comprising:
instructions to receive an event from a producer;
instructions to translate the event from a first language into a general language;
instructions to send the event to a collaboration bus;
instructions to execute a subscriber services module, the subscriber services module comprising:
instructions to receive a subscription to an event from a first listener;
instructions to determine if the first listener has subscribed to the event by identifying the subscription to the event; instructions to provide an indication to a second API as to whether the first listener has subscribed to the event;
instructions to execute the second API, the second API comprising:
instructions to retrieve a list of synchronous listeners, wherein the list includes at least the first listener and a second listener, wherein each listener in the list receives the event in an order provided by the list;
instructions to receive the event from the collaboration bus;
instructions to receive the indication from the subscriber services module as to whether the first listener has subscribed to the event;
if the first listener has subscribed to the event, instructions to translate the event from the general language into a second language;
instructions to send the event to the first listener;

instructions to receive a first response from the first listener, wherein the first response includes a change to the event;
instructions to incorporate the change into the event;
instructions to send the event with the incorporated change to the second listener
instructions to determine if the event is synchronous; and
if a third listener indicates that the third listener wants to receive the event asynchronously, instructions to send the event to the third listener as an asynchronous event.

11. The computer readable medium as defined in claim 10, further comprising:
instructions to determine if the event is synchronous; and
if the event is asynchronous, instructions to send the event to a first listener and a second listener substantially simultaneously.

12. The computer readable medium as defined in claim 10, wherein the event is communicated with one of a SIP protocol or an HTTP protocol.

13. The computer readable medium as defined in claim 10, further comprising instructions to apply a filter for the first listener or the second listener to determine if the first listener or the second listener needs to receive the event.

* * * * *